US008141002B2

(12) United States Patent
Moses et al.

(10) Patent No.: US 8,141,002 B2
(45) Date of Patent: Mar. 20, 2012

(54) SYSTEM AND METHOD FOR VISUAL REPRESENTATION OF A SOCIAL NETWORK CONNECTION QUALITY

(75) Inventors: Veronique L. Moses, Raleigh, NC (US); Raquel B. Bryant, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 11/781,028

(22) Filed: Jul. 20, 2007

(65) Prior Publication Data

US 2009/0024747 A1 Jan. 22, 2009

(51) Int. Cl.
*G06F 3/048* (2006.01)
(52) U.S. Cl. .......................... 715/853; 715/772
(58) Field of Classification Search .................. 715/734, 715/853, 751, 772; 345/440
See application file for complete search history.

(56) References Cited

U.S. PATENT DOCUMENTS

| | | | | |
|---|---|---|---|---|
| 6,850,253 | B1* | 2/2005 | Bazerman et al. | 715/734 |
| 6,980,870 | B1* | 12/2005 | Mok et al. | 700/90 |
| 7,188,153 | B2 | 3/2007 | Lunt et al. | |
| 7,213,206 | B2* | 5/2007 | Fogg | 715/706 |
| 7,539,697 | B1* | 5/2009 | Akella et al. | 1/1 |
| 2002/0145626 | A1* | 10/2002 | Richards et al. | 345/741 |
| 2005/0267887 | A1* | 12/2005 | Robins | 707/9 |
| 2006/0005133 | A1 | 1/2006 | Lyle et al. | |
| 2006/0031370 | A1 | 2/2006 | Lyle et al. | |
| 2006/0041624 | A1 | 2/2006 | Lyle et al. | |

OTHER PUBLICATIONS

Mutton, Paul. "Inferring and Visualizing Social Networks on Internet Relay Chat." Proceedings of the Eighth International Conference on Information Visualization. IEEE Computer Society. 2004.*
Heer, J.; Boyd, D. "Vizster: visualizing online social networks," Information Visualization, 2005. INFOVIS 2005. IEEE Symposium on. pp. 32-39, Oct. 23-25, 2005.*
Dunbar Triage: Too Many Connections, available at http://www.lifewithalacrity.com/2005/02/dunbar_triage_t.html, last visited May 11, 2007, pp. 1-23.
Thomas Erickson et al., Socially Translucent Systems: Social Proxies, Persistent Conversation, and the Design of "Babble", available at http://www.pliant.org/personal/Tom_Erickson/loops.chi99.paper.html, last visited May 11, 2007, pp. 1-14.
Olga Kharif, Social Networking Goes Mobile, Businessweek, May 31, 2006, pp. 1-2, available at http://www.businessweek.com/print/technology/content/may2006/tc20060530_170086.htm. Valdis Krebs, Social Network Analysis, A Brief Introduction, available at http://www.orgnet.com/sna.html, last visited May 11, 2007, pp. 1-4.
Darren R. Millen et al., Mind Maps and Causal Models: Using Graphical Representations of Field Research Data, CHI 97 Electronic Publications, available at http://acm.org/sigchi/chi97/proceedings/poster/mil.htm, last visited May 11, 2007, pp. 1-5.
Peter Morville, Social Network Analysis, Semantic Studios, available at http://semanticstudios.com/publications/semantics/000006.php, last visited May 11, 2007, pp. 1-5.
Boyd "Faceted ID/Entity: Managing Representation in a Digital World" Massachusetts Institute of Technology, (Aug. 2002), 118 pages.
Viegas et al. "Digital Artifacts for Remembering and Storytelling: PostHistory and Social Network Fragments" Proceedings of the 37th Annual Hawaii International Conference on System Sciences (HICSS'04), Track 4, vol. 4, (2004), 10 pages.

\* cited by examiner

*Primary Examiner* — Kieu Vu
*Assistant Examiner* — Blaine T. Basom
(74) *Attorney, Agent, or Firm* — Jeffrey T. Holman

(57) ABSTRACT

An apparatus, system, and method to generate a graphical representation of a social network. The computer program product includes a computer useable storage medium to store a computer readable program that, when executed on a computer, causes the computer to perform operations related to generating a graphical representation of a social network. The operations include an operation to display a first node and a second node in a social network. The operations also include an operation to display an actual quality indicator representative of an actual level of quality of a connection between the first and second nodes of the social network. The operations also include an operation to display a target quality indicator representative of a target level of quality of the connection between the first and second nodes of the social network.

20 Claims, 7 Drawing Sheets

SYSTEM AND METHOD FOR VISUAL REPRESENTATION OF A SOCIAL NETWORK CONNECTION QUALITY

BACKGROUND OF THE INVENTION

Social networking analysis (SNA) involves mapping and measuring relationships and flows between social entities such as people, groups, organizations, animals, computers, or other information/knowledge processing entities. Each social entity forms a node in a social network. Hence, the nodes in a social network are the people and/or groups, and the links between the nodes show how the various nodes of the social network are connected. In other words, the links between the nodes show how information might be communicated to and from each of the nodes in the social network. The interconnections of the various nodes in the social network may be illustrated by using a social network map.

FIG. 1A depicts a schematic block diagram of a conventional graphical representation of a social network 10. The illustrated social network 10 includes a user node 12 and shows how the user node 12 is connected to several additional nodes. In particular, the user node is connected to multiple first degree nodes 14, second degree nodes 16, and third degree nodes 18. The first degree nodes 14 are connected to the user node 12 by direct relationship paths, as indicated by the arrows originating at the user node 12 and pointing toward the first degree nodes 14. In contrast, the second degree nodes 16 and the third degree nodes 18 are connected to the user node 12 by indirect relationship paths via the first degree nodes 14.

FIG. 1B depicts a schematic block diagram of another conventional graphical representation of a social network 20. The illustrated social network 20 includes a user node 12 and several first degree nodes 14. For clarity, nodes of greater degrees, which are connected to the user node 12 via the first degree nodes 14, are not shown. In both of the social networks 10 and 20 shown in FIGS. 1A and 1B, the connectors between the various nodes show that the corresponding nodes are linked by a social interaction.

SUMMARY OF THE INVENTION

Embodiments of an apparatus are described. In one embodiment, the apparatus is a computer program product comprising a computer useable storage medium to store a computer readable program that, when executed on a computer, causes the computer to perform certain operations. In one embodiment, the operations include an operation to display a first node and a second node in a social network, an operation to display an actual quality indicator representative of an actual level of quality of a connection between the first and second nodes of the social network, and an operation to display a target quality indicator representative of a target level of quality of the connection between the first and second nodes of the social network. Other embodiments of the apparatus are also described.

Embodiments of a system are also described. In one embodiment, the system is a system to generate a graphical representation of a social network map. An embodiment of the system includes an electronic memory device, a quality mapping engine, and a graphical display. The electronic memory device is configured to store node information for a plurality of nodes in a social network. The quality mapping engine is coupled to the electronic memory device. The quality mapping engine is configured to assign an actual level of quality to a connection between a pair of nodes of the plurality of nodes in the social network. The quality mapping engine assigns the actual level of quality based on at least a mode of communication between the pair of nodes and a type of social relationship between the pair of nodes. The graphical display is coupled to the quality mapping engine. The graphical display is configured to convey a visual representation of a map of at least a portion of the social network. The map includes the pair of nodes, an actual quality indicator corresponding to the actual level of quality of the connection between the pair of nodes, and a target quality indicator corresponding to a target level of quality of the connection between the pair of nodes. Other embodiments of the system are also described.

Embodiments of a method are also described. In one embodiment, the method is a method for generating a social network map. An embodiment of the method includes generating a first visual indicator representative of a first node in the social network and generating a second visual indictor representative of a second node in the social network. The method also includes displaying an actual quality indicator representative of an actual level of quality of a connection between the first and second nodes in the social network. The actual level of quality depends on at least a mode of communication between the pair of nodes and a type of social relationship between the pair of nodes. The method also includes displaying a target quality indicator representative of a target level of quality of the connection between the first and second of nodes in the social network. Other embodiments of the method are also described.

Other aspects of embodiments of the system, method, and apparatus will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate generating and displaying a graphical representation of a social network map. The social network map includes one or more quality indicators which convey levels of quality of connections between corresponding social network nodes. Each quality indicator corresponds to a level of quality of the connection between a pair of social network nodes. The level of quality of the connection can be based on many different factors. In some embodiments, the level of quality of a particular connection depends on the frequency of communication between the corresponding pair of social network nodes. In some embodiments, the level of quality of a particular connection depends on the mode of communication used between the corresponding pair of social network nodes. In some embodiments, the level of quality of a particular connection at least partially depends on the role (e.g., personal, professional, academic, etc.) of the relationship. Other embodiments may determine the level of quality of a connection based on a combination of these factors and/or other factors.

Additionally, some embodiments described below implement a plurality of rules and policies to determine the level of quality of the connection between a pair of social network nodes. In one embodiment, the rules and policies are role-specific so that different rules and policies can potentially be applied to different types of social roles (e.g., friends, family, work, etc.) corresponding to each pair of social network nodes.

Figure 1A:
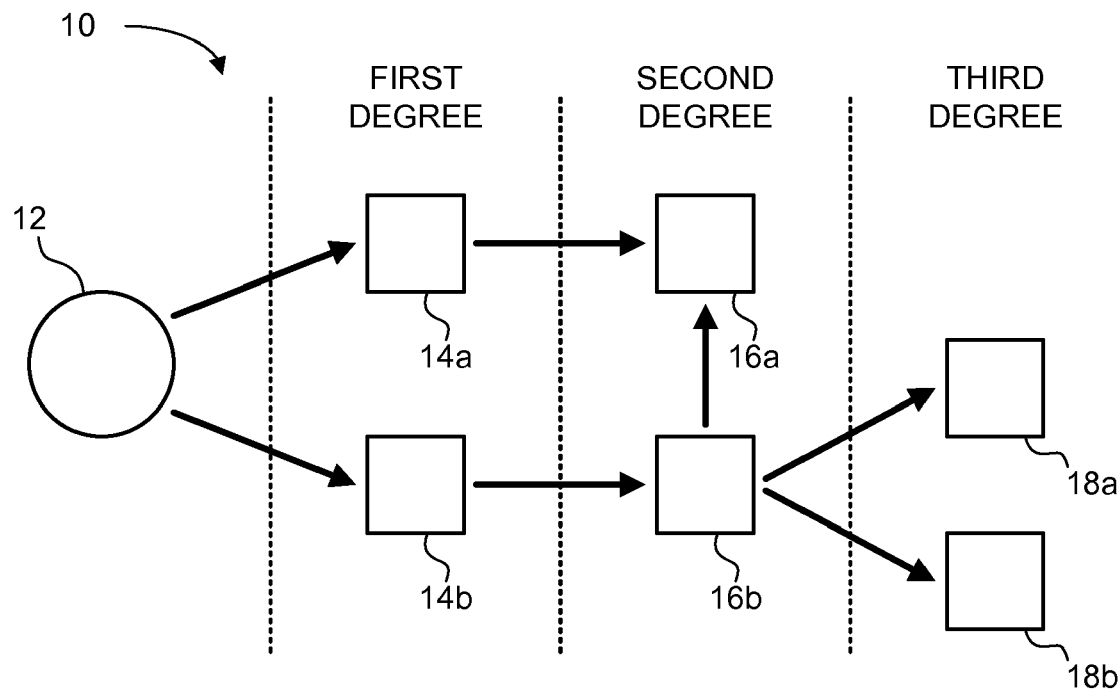
FIG. 1A depicts a schematic block diagram of a conventional graphical representation of a social network.
Figure 1B:
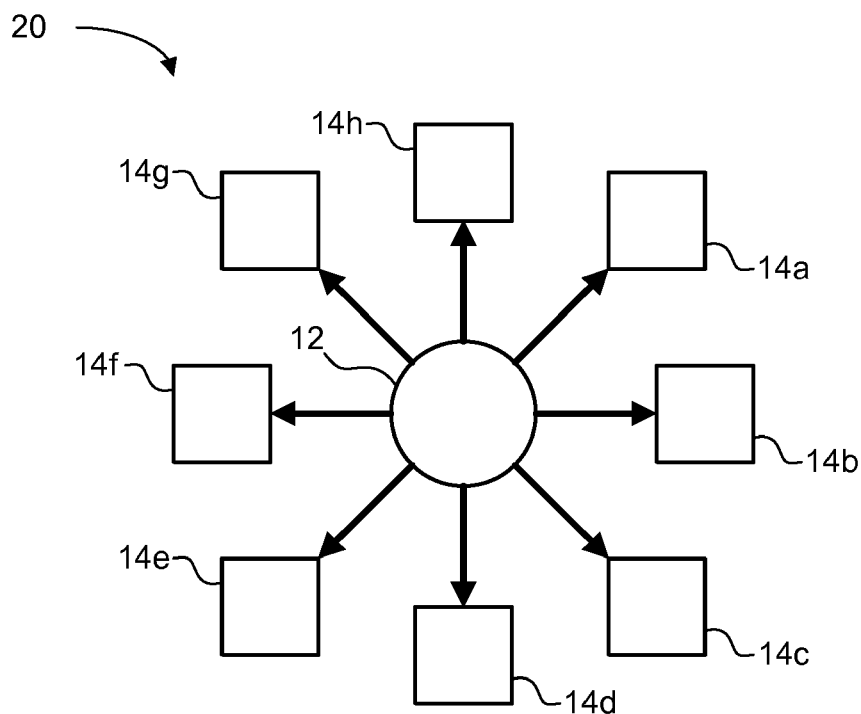
FIG. 1B depicts a schematic block diagram of another conventional graphical representation of a social network.
Figure 2:
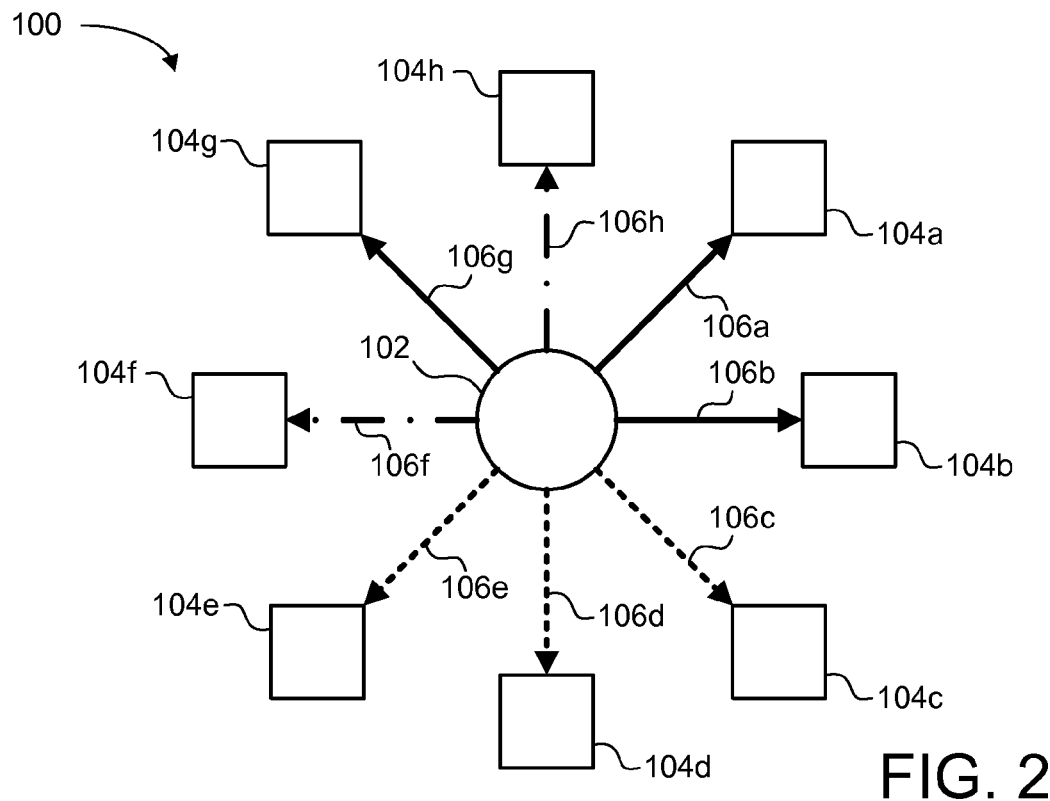
FIG. 2 depicts a schematic block diagram of one embodiment of a graphical representation of connection quality within a social network.

FIG. 2 depicts a schematic block diagram of one embodiment of a graphical representation of connection quality within a social network 100. The illustrated social network 100 includes a user node 102 and a plurality of connected nodes 104. In some embodiments, the user node 102 also may be referred to as the owner of the social network 100. The connected nodes 104 are representative of first degree nodes that are directly connected to the user node 102. The connected nodes 104 are also representative of nodes of greater degrees (e.g., second and third degree nodes) that are indirectly connected to the user node 102 via one or more of the first degree nodes 104.

The illustrated social network 100 also includes a plurality of quality indicators in the form of connector lines 106. Each of the connector lines 106 connects the user node 102 to a corresponding connected node 104. Additionally, each of the connector lines 106 has a line characteristic that is unique to the level of quality of the connection between the corresponding pair of nodes. In the illustrated embodiment, the unique line characteristics are different line types such as solid, dashed, and alternating dashes and dots. These line types are exemplary and other line types may be used in other embodiments. Additionally, although the social network 100 of FIG. 2 shows three different line types, other embodiments may use fewer or more line types, depending on the granularity of the levels of quality of the social network 100.

As an example, the solid lines 106a, 106b, and 106g represent social connections that have a high level of quality between the user node 102 and the corresponding connected nodes 104a, 104b, and 104g. In one embodiment, a connection designated as having a high level of quality may be indicative of a good personal relationship, a relationship characterized by frequent contact, a relationship in which communications occur through a personal mode of communication (e.g., telephone calls, in-person visits, etc.), or another type of relationship characteristic.

Continuing the same example, the connector lines 106f and 106h with an alternating pattern of dashes and dots represent social connections that have a medium level of quality between the user node 102 and the corresponding connected nodes 104f and 104h. In one embodiment, a connection designated as having a medium level of quality may be indicative of a collegiate acquaintance, a relationship characterized by somewhat regular contact, a relationship in which communications occur through a somewhat impersonal mode of communication (e.g., email, group settings, etc.), or another type of relationship characteristic.

Furthermore, the dashed connector lines 106c-106e represent, for example, social connections that have a low level of quality between the user node 102 and the corresponding connected nodes 104c-104e. In one embodiment, a connection designated as having a low level of quality may be indicative of a distant relationship, a relationship characterized by infrequent contact, a relationship in which communications occur through a highly impersonal mode of communication (e.g., mass emails, facsimile transmissions, etc.), or another type of relationship characteristic.

Although the social network 100 of FIG. 2 implements different line types to indicate different levels of quality for the corresponding social network connections, other embodiments may implement other types of connector lines with other unique line characteristics. For example, some embodiments of the social network 100 use unique line weights. Other embodiments use unique line colors. Other embodiments use unique line lengths. Other embodiments use a combination of different types of line characteristics.

Figure 3:
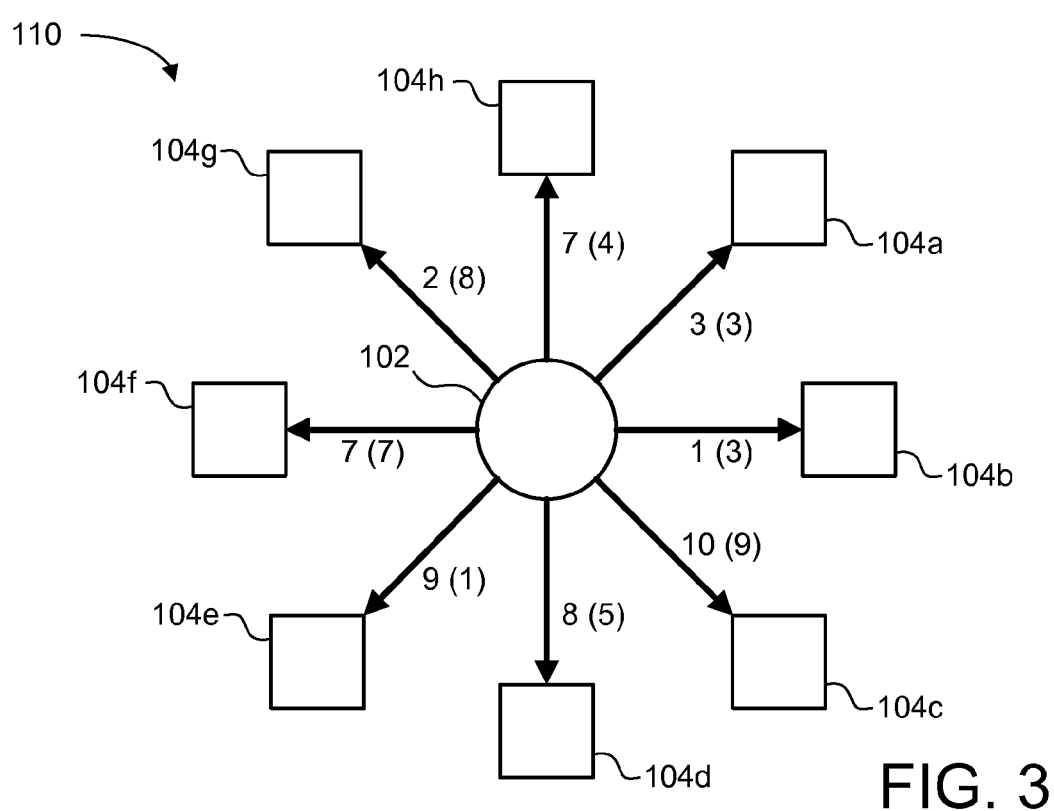
FIG. 3 depicts a schematic block diagram of another embodiment of a graphical representation of connection quality within a social network.

FIG. 3 depicts a schematic block diagram of another embodiment of a graphical representation of connection quality within a social network 110. The illustrated social network 110 includes a user node 102 and a plurality of connected nodes 104, similar to the social network 100 of FIG. 2. However, instead of using different line types as quality indicators to indicate the quality of the connections between the user node 102 and the corresponding connected nodes 104, the social network 110 implements quality indicators that include one or more numbers located in proximity to a visual representation of the connection between each corresponding pair of nodes.

More specifically, the illustrated social network 110 provides two numbers next to each of the connections (shown by the arrows). The first number represents an actual level of quality of the corresponding connection, according to one or more rules used to determine the actual level of quality. The second number (shown in parentheses) represents a target level of quality of the corresponding connection. In other words, some embodiments of the quality indicator include multiple indicators such as the actual quality indicator and the target quality indicator. The actual quality indicator corresponds to an actual level of quality of the connection between the pair of nodes, and the target quality indicator corresponding to a target level of quality of the connection between the pair of nodes. In this way, the social network 110 may show more than just the connection between two nodes and the quality of the connection between two nodes. The social network 110 also shows an indication of the target level of quality that, for example, a user establishes as a goal for changing the quality of the corresponding social relationship.

As an example, the actual level of quality of the connection between the user node 102 and the connected node 104b is designated as a 1. Using a scale of 1 to 10 (with 1 designating a high level of quality and 10 designating a low level of quality) as a convention, the 1 next to the connection between the user node 102 and the connected node 104b indicates that the corresponding connection is actually a high level of quality. The actual level of quality for the connection between the user node 102 and the connected node 104g is also designated as a high level of quality, although not as high as the connection between the user node 102 and the connected node 104b. Hence, the quality indicators may be used to order the various connections according to the highest and lowest levels of quality.

Continuing with the previous example, the illustrated embodiment also shows that the target levels of quality (shown in parenthesis for each connection) may be the same as or different from the actual levels of quality. In particular, some of the target levels of quality may indicate that the target level of quality is higher (i.e., designated by a lower number approaching 1) than the actual level of quality of the connection. For example, the connection between the user node 102 and the connected node 104h indicates that the target level of quality is a 4, which indicates a higher level of quality than the actual level of quality, which is a 7. Other target levels of quality indicate that the target level of quality is lower (i.e., designated by a higher number approaching 10) than the actual level of quality of the connection. For example, the connection between the user node 102 and the connected node 104g indicates that the target level of quality is an 8, which indicates a lower level of quality than the actual level of quality, which is a 2. A summary of the actual and target levels of quality of the social network 110 of FIG. 3 is shown in the following table.

| CONNECTED NODE | ACTUAL LEVEL OF QUALITY | TARGET LEVEL OF QUALITY |
| --- | --- | --- |
| 104a | 3 | 3 |
| 104b | 1 | 3 |
| 104c | 10 | 9 |
| 104d | 8 | 5 |
| 104e | 9 | 1 |
| 104f | 7 | 7 |
| 104g | 2 | 8 |
| 104h | 7 | 4 |

Figure 4:
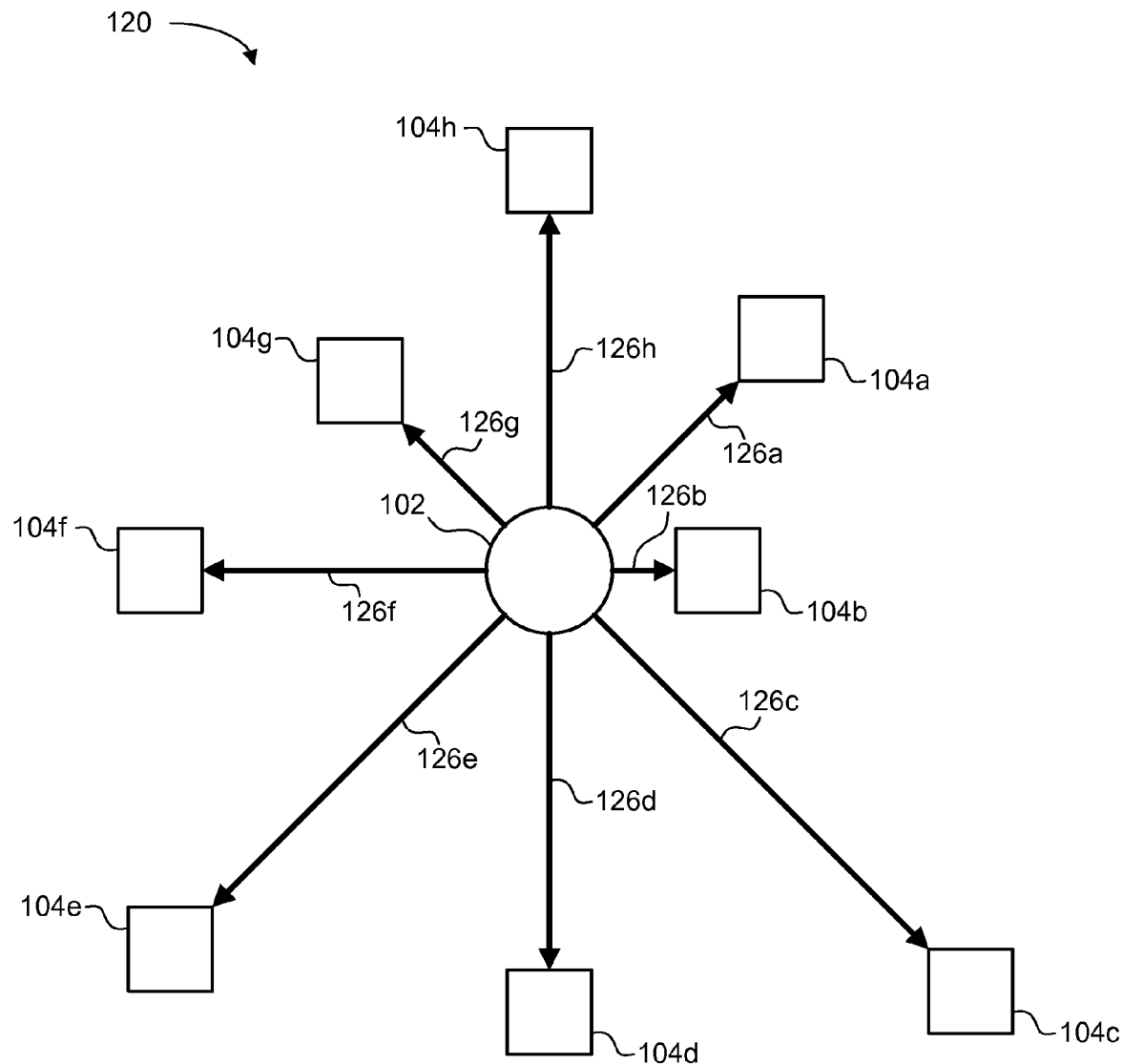
FIG. 4 depicts a schematic block diagram of another embodiment of a graphical representation of connection quality within a social network.

FIG. 4 depicts a schematic block diagram of another embodiment of a graphical representation of connection quality within a social network 120. The illustrated social network 120 includes a user node 102 and a plurality of connected nodes 104, similar to the social network 100 of FIG. 2. However, instead of using different line types as quality indicators to indicate the quality of the connections between the user node 102 and the corresponding connected nodes 104, the social network 120 implements the quality indicators using connector lines 126 with different lengths.

For ease of explanation, the lengths of the connector lines 126 approximately correspond to the actual levels of quality indicated in the social network 110 of FIG. 3. Hence, the length of the connector line 126a between the user node 102 and the connected node 104a is a quality indicator representative of an actual level of quality of about 3 (on a scale of 1 to 10). Similarly, the length of the connector line 126b between the user node 102 and the connected node 104b is a quality indicator representative of an actual level of quality of about 1. Since 1 is the highest level of quality (e.g., representative of the closest personal relationship), the connector line 126b is the shortest length out of all of the connector lines 126 shown in the social network 120. In contrast, the length of the connector line 126c between the user node 102 and the connected node 104c is a quality indicator representative of an actual level of quality of about 10. Since 10 is the lowest level of quality (e.g., representative of the least personal relationship), the connector line 126c is the longest length out of all of the connector lines 126 shown in the social network 120. The remaining connector lines 126d-126h are each shown with a length relative to the corresponding actual level of quality of the represented connection.

Although the connection lines 126 of the social network 120 shown in FIG. 4 are described as representing actual levels of quality of the connections between the user node 102 and the connected nodes 104, other embodiments of the social network 120 may use the connector lines 126 to represent target levels of quality of the connections between the user node 102 and the connected nodes 104.

Figure 5:
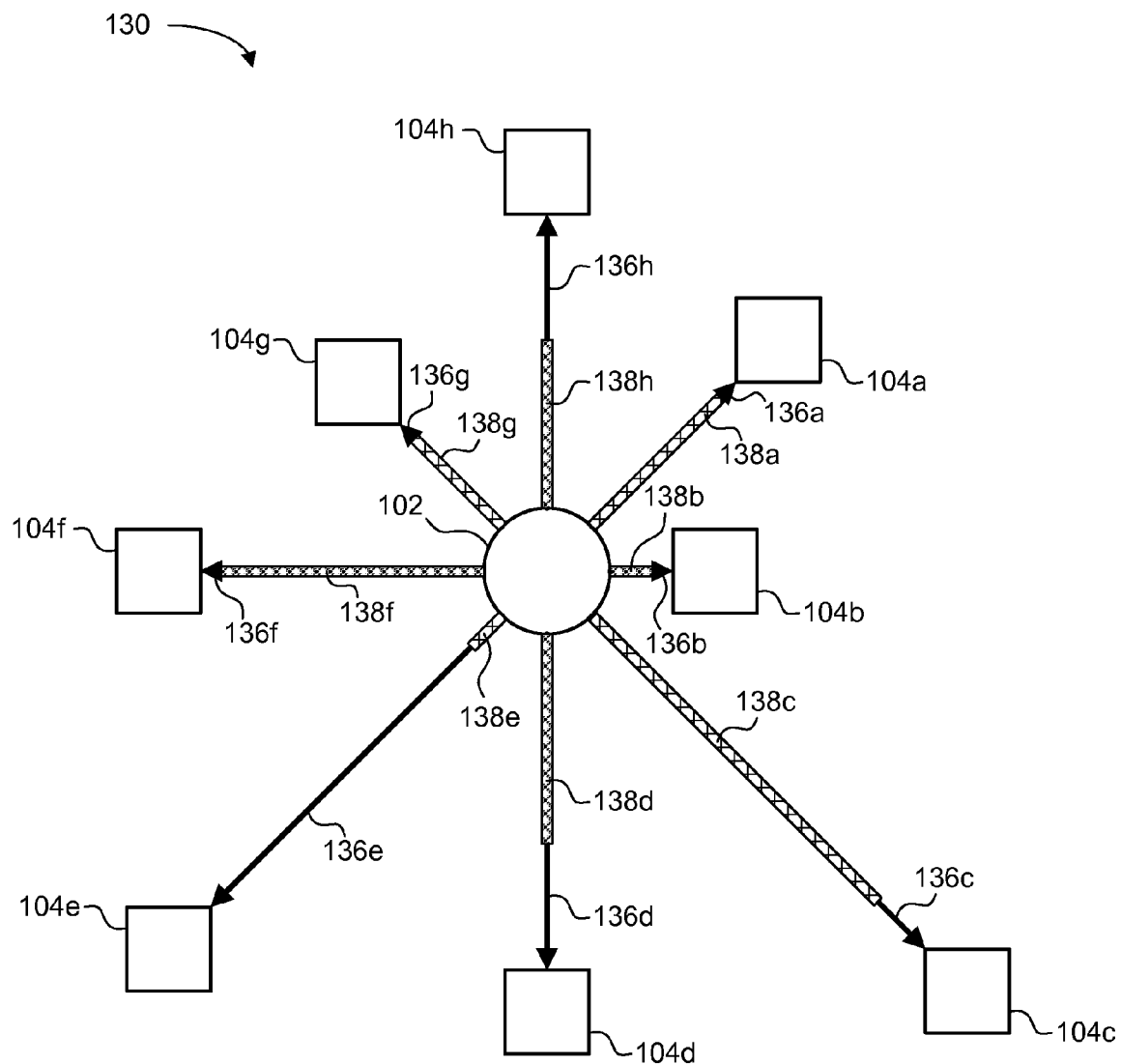
FIG. 5 depicts a schematic block diagram of another embodiment of a graphical representation of connection quality within a social network.

FIG. 5 depicts a schematic block diagram of another embodiment of a graphical representation of connection quality within a social network 130. The illustrated social network 130 includes a user node 102 and a plurality of connected nodes 104, similar to the social network 120 of FIG. 4. However, in addition to showing connector lines 136 (shown as solid lines) to represent the actual level of quality for each connection, the social network 130 also shows target quality indicators 138 (shown as hashed patterns) to represent the target level of quality for each connection. It should be noted that, in some instances, the actual quality indicators shown as connector lines 136 are at least partially hidden behind the target quality indicators 138. However, other embodiments may implement other actual and target quality indicators that may be shown simultaneously without overlapping and without intersecting.

For ease of explanation, the lengths of the connector lines 136 approximately correspond to the actual levels of quality indicated in the social network 120 of FIG. 4. Additionally, the lengths of the target quality indicators 138 approximately correspond to the target levels of quality indicated in the social network 110 of FIG. 3. Using the social network 130, a viewer can gain a visual understanding of both the actual and target levels of quality for each of the connections between the user node 102 and the corresponding connected nodes 104. Additionally, the viewer can appreciate the relative difference between the actual and target levels of quality for each of the connections. It should be noted that, where the target level of quality represents a lower quality (i.e., a longer length), than the actual level of quality, some embodiments of the social map 130 only show the target quality indicator to the extent of the corresponding actual quality indicator. However, other embodiments may show the target quality indicator extending beyond the corresponding actual quality indicator and/or the connected node 104.

Figure 6:
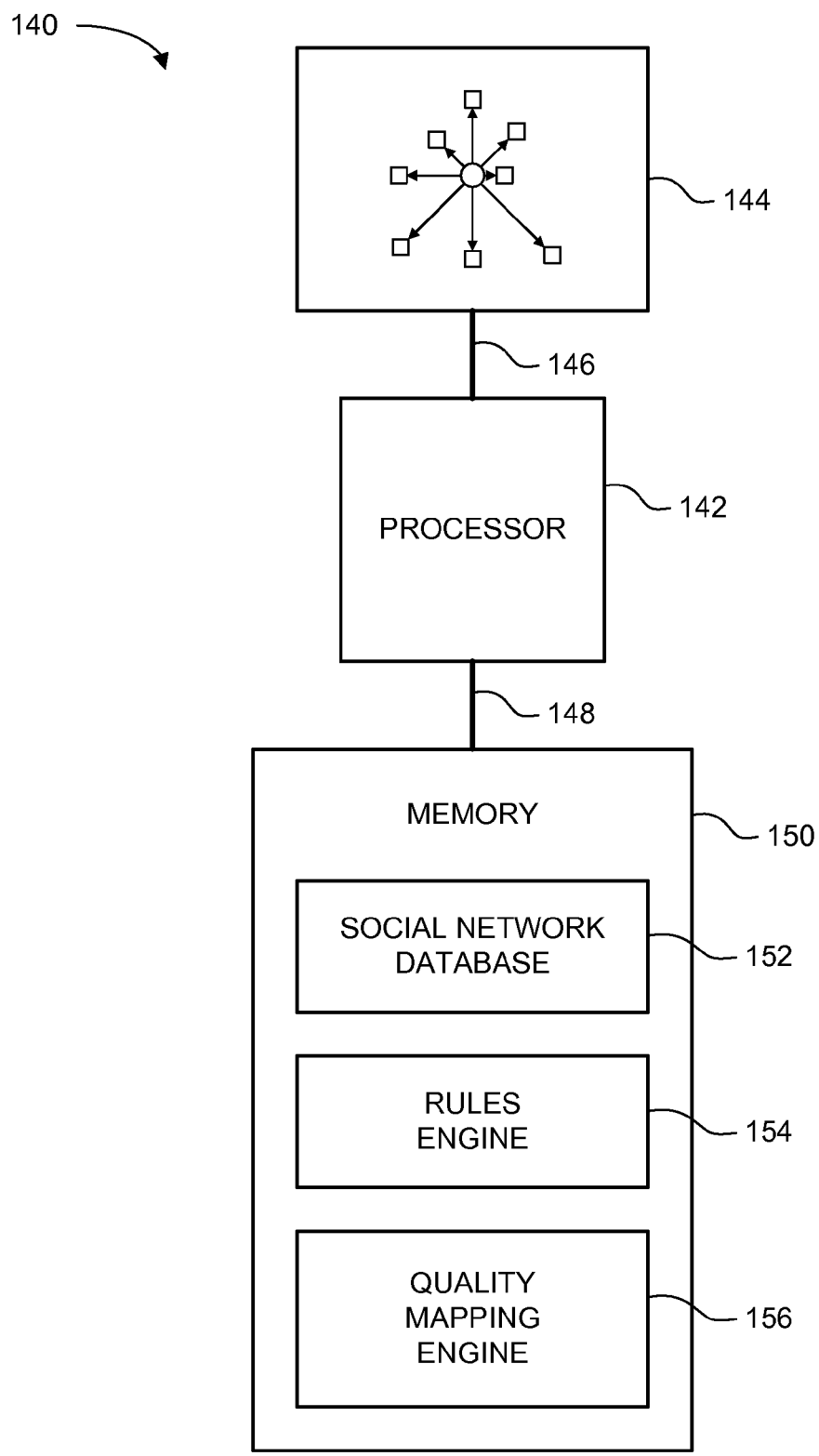
FIG. 6 depicts a schematic block diagram of one embodiment of a social network system.

FIG. 6 depicts a schematic block diagram of one embodiment of a social network system 140. Although the depicted social network system 140 is shown and described herein with certain components and functionality, other embodiments of the social network system 140 may be implemented with fewer or more components or with less or more functionality. Additionally, some embodiments of the social network system 140 may include similar components arranged in another manner to provide similar functionality, in one or more aspects.

The illustrated social network system 140 includes a processor 142, a display device 144, and an electronic memory device 150. In one embodiment, the processor 142 is a central processing unit (CPU). In other embodiments, the processor 142 is a graphical processing unit (GPU) or another type of processing device such as a general purpose processor, an application specific processor, or a microprocessor. In general, the processor 142 executes one or more instructions to provide operational functionality to the social network system 140. The instructions may be stored locally in the processor 142, in the electronic memory device 150, or in another data storage device. Alternatively, the instructions may be distributed across one or more devices such as the processor 142, the electronic memory device 150, or another data storage device.

In some embodiments, the display device 144 is a graphical display such as a cathode ray tube (CRT) monitor, a liquid crystal display (LCD) monitor, or another type of display device. The display device 144 is coupled to the processor 142, for example, via a data bus 146. In one embodiment, the display device 144 is configured to convey a visual representation of a map of at least a portion of a social network such as the social networks described above and shown in FIGS. 2-5. In particular, the map includes a pair of nodes (e.g., a user node 102 and a connected node 104) and a quality indicator corresponding to the level of quality of the connection between the pair of nodes.

The electronic memory device 150 is also coupled to the processor 142. In one embodiment, the electronic memory device 150 is local memory within the processor 142. In other embodiments, the electronic memory device 150 is separate from the processor 142 and coupled to the processor 142 via one or more data, address, and/or control buses 148.

The illustrated electronic memory device 150 includes a social network database 152, a rules engine 154, and a quality mapping engine 156. In one embodiment, the electronic memory device 150 stores node information in the social network database 152. The node information relates to a plurality of nodes in a social network. The node information may include node names or other identifiers, communication logs, communication activity plans, and other information related to the nodes of the social network, as well as the connections among the nodes of the social network.

In one embodiment, the rules engine 154 stores a plurality of rules and/or policies to determine a level of quality for a connection between a pair of nodes in a social network. Additionally, the rules engine 154 may be used to define such rules and/or policies. For example, a user may access the rules engine 154 to define rules to determine a level of quality for a connection between a pair of nodes based on the frequency of communication between the nodes. The following table provides an exemplary set of rules to determine the level of quality based on the frequency of communication between a pair of nodes.

| FREQUENCY | LEVEL OF QUALITY |
| --- | --- |
| Daily | 1 (High) |
| Weekly | 2 |
| Monthly | 3 |
| >Monthly | 4 (Low) |

In another embodiment, the rules engine 154 stores a plurality of rules to determine a level of quality for a connection between a pair of nodes based on the mode of communication used to communicate between the nodes. The following table provides an exemplary set of rules to determine the level of quality based on the mode of communication used to communicate between the nodes.

| MODE | LEVEL OF QUALITY |
| --- | --- |
| In-person Conversation | 1 (High) |
| Telephone Conversation | 2 |
| Instant Message | 3 |
| Text Message | 4 |
| Email | 5 (Low) |

In another embodiment, the rules engine 154 stores a plurality of rules to determine a level of quality for a connection between a pair of nodes based on a combination of the mode of communication and the frequency of communication. The following table provides an exemplary set of rules to determine the level of quality based on the mode of communication and the frequency of communication between the nodes.

| MODE | FREQUENCY | LEVEL OF QUALITY |
| --- | --- | --- |
| In-person Conversation | Daily | 1 (High) |
| Telephone Conversation | Daily | 1 |
| In-person Conversation | Weekly | 2 |
| Instant Message | Daily | 2 |
| Telephone Conversation | Weekly | 3 |
| Text Message | Daily | 3 |
| Instant Message | Weekly | 4 |
| Email | Daily | 4 |
| In-person Conversation | Monthly | 5 |
| Text Message | Weekly | 5 |
| Telephone Conversation | Monthly | 6 |
| Instant Message | Monthly | 6 |
| Email | Weekly | 6 |
| In-person Conversation | >Monthly | 7 |
| Instant Message | >Monthly | 7 |
| Text Message | Monthly | 7 |
| Email | Monthly | 8 |
| Telephone Conversation | >Monthly | 9 |
| Text Message | >Monthly | 9 |
| Email | >Monthly | 10 (Low) |

Although the rules described above provide several examples of some of the types of rules that might be defined by the rules engine 154, other embodiments of the rules engine 154 may define other types of rules. Additionally, the rules engine 154 may define some or all of the rules using other methods that result in the same or different functionality. For example, some embodiments of the rules engine 154 may provide weighting factors for different rules so that some of the quality factors may be weighted more heavily than other quality factors.

In another embodiment, the rules engine 154 is configured to define role-specific rules which are specifically applicable to a certain type of social relationship between a pair of nodes. Each set of role-specific rules may be unique to the specified role. Some exemplary roles for which different role-specific rules may be established include personal, professional, academic, community, and so forth. Hence, the rules for determining the level of quality for a personal relationship (e.g., between long-term friends) may be different from the rules for determining the level of quality for a professional relationship (e.g., between coworkers). In this way, the rules engine 154 may facilitate customization of the roles and rules which are used to determine the level of quality for different types of social connections. The following table provides contrasting exemplary sets of rules for personal and professional relationships to illustrate the potential impact of role-specific rules. In particular, the exemplary rules illustrate an embodiment in which instant message and text message communications are associated with lower levels of quality for professional relationships than for personal relationships. The different levels of quality for the professional relationship are marked with an asterisk.

| MODE | FREQUENCY | LEVEL OF QUALITY: | |
|---|---|---|---|
| | | PERSONAL | PROFESSIONAL |
| In-person Conversation | Daily | 1 (High) | 1 (High) |
| Telephone Conversation | Daily | 1 | 1 |
| In-person Conversation | Weekly | 2 | 2 |
| Instant Message | Daily | 2 | 5* |
| Telephone Conversation | Weekly | 3 | 3 |
| Text Message | Daily | 3 | 6* |
| Instant Message | Weekly | 4 | 7* |
| Email | Daily | 4 | 4 |
| In-person Conversation | Monthly | 5 | 5 |
| Text Message | Weekly | 5 | 8* |
| Telephone Conversation | Monthly | 6 | 6 |
| Instant Message | Monthly | 6 | 9* |
| Email | Weekly | 6 | 6 |
| In-person Conversation | >Monthly | 7 | 7 |
| Instant Message | >Monthly | 7 | 10* |
| Text Message | Monthly | 7 | 10* |
| Email | Monthly | 8 | 8 |
| Telephone Conversation | >Monthly | 9 | 9 |
| Text Message | >Monthly | 9 | 10* |
| Email | >Monthly | 10 (Low) | 10 (Low) |

The quality mapping engine 156 is configured to assign a level of quality to a connection between a pair of nodes in a social network. In one embodiment, the quality mapping engine 156 uses the rules defined by the rules engine 154 in order to determine the level of quality for each connection. In some embodiments, the quality mapping engine 156 assigns the level of quality to the connection based on the frequency of communication between the pair of nodes. In other embodiments, the quality mapping engine 156 assigns the level of quality to the connection based on the mode of communication between the pair of nodes. In other embodiments, the quality mapping engine 156 assigns the level of quality to the connection based, at least in part, on the role (e.g., personal, professional, academic, etc.) of the relationship. In other embodiments, the quality mapping engine 156 assigns the level of quality to the connection based on a combination of the frequency, mode, role, or other characteristics of communication between the pair of nodes.

Additionally, the quality mapping engine 156 may assign both an actual level of quality and a target level of quality to one or more connections among the nodes of the social network. Hence, the quality indicator displayed by the display 144 may include an actual quality indicator and a target quality indicator. The actual quality indicator is associated with the actual level of quality of the connection between the pair of nodes. The target quality indicator is associated with the target level of quality of the connection between the pair of nodes.

In further embodiments, the quality mapping engine 156 is configured to suggest a communication activity to adjust the level of quality of the connection between the pair of nodes based on the rules defined by the rules engine 154. For example, if the actual level of quality for a connection is assigned a value of 7 (on a scale of 1 to 10), and the target level of quality is a value of 2, then the quality mapping engine 156 may recommend that a user increase the frequency of communication, change the mode of communication, or change both the frequency and mode of communication in order to increase the actual level of quality over time to match the target level of quality.

Furthermore, some embodiments of the quality mapping engine 156 may make specific suggestions such as to send an email at a particular time, to provide an alarm notification to make a telephone call to the person or entity represented by the connected node 104, or to set a goal of scheduling a lunch to meet with the person. Other embodiments send an alert when a level of connection falls below a given threshold. Other embodiments send an alert when a threshold number of most recent communications occur via a particular mode of communication. Although exemplary suggestions are described herein, other embodiments may make other suggestions, depending on the type of social entity represented by the nodes of the social network, as well as the type of rules defined by the rules engine 154. In some embodiments, these suggested communication activities constitute a communication activity plan.

Figure 7:
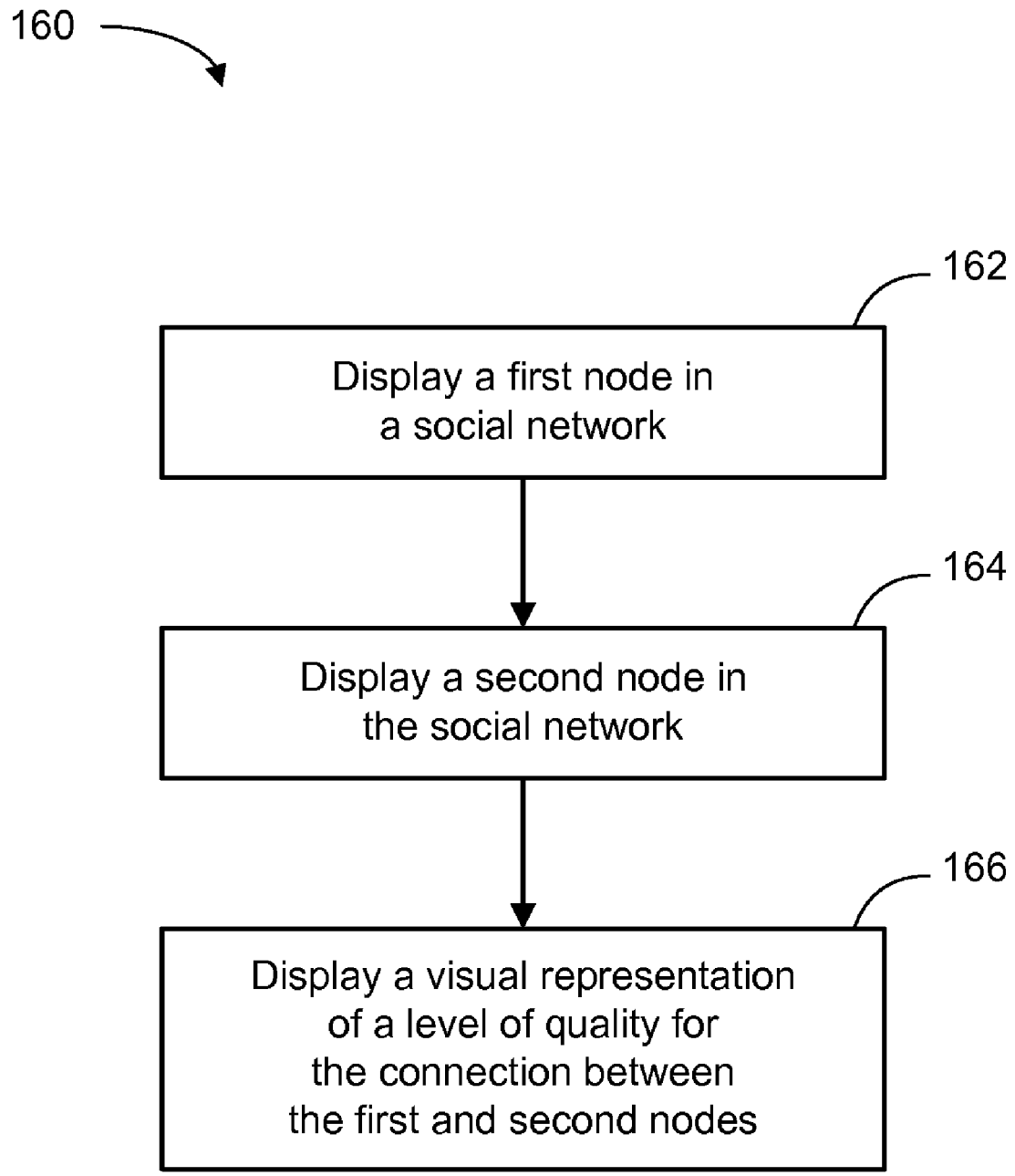
FIG. 7 depicts a schematic flow chart diagram of one embodiment of a visual representation method for representing connection quality within a social network.

FIG. 7 depicts a schematic flow chart diagram of one embodiment of a visual representation method 160 for representing connection quality within a social network. For ease of explanation, the visual representation method 160 is described with reference to the social network 130 of FIG. 5. However some embodiments of the visual representation method 160 may be implemented with other social networks and/or social network maps. Additionally, the visual representation method 160 is described in conjunction with the social network system 140 of FIG. 6, but some embodiments of the visual representation method 160 may be implemented with other social network systems.

In the illustrated visual representation method 160, the display 144 displays 162 a first node such as the user node 102 in the social network 130. In particular, the display 144 generates a first visual indicator representative of the first node 102 in the social network 130. The display 144 also displays 164 a second node such as a connected node 104 in the social network 130. In particular, the display 144 generates a second visual indictor representative of the second node 104 in the social network 130. In one embodiment, the display 144 receives node information from the social network database 152 via the processor 142 in order to display the user node 102 and the connected node 104.

The display 144 also displays 166 a visual representation of a level of quality for the connection between the first node 102 and the second node 104. In particular, the display 144 generates a visual quality indicator representative of the level of quality of the connection between the user node 102 and the connected node 104 in the social network 130. As described above, the quality indicator may be represented by an actual quality indicator 136, as well as a target quality indicator 138. Each of the quality indicators may be shown as a connector line, a number, or another visual indicator. In some embodiments, the quality indicators are visually distinguishable based on unique characteristics such as line type, line weight, line color, line length, or another distinguishing characteristic.

In some embodiments, the visual representation method 160 also includes assigning the visual quality indicator to the connection between the first and second nodes based on a frequency of communication between the first and second nodes and/or a mode of communication between the first and second nodes. In some embodiments, the visual representation method 160 also includes storing a plurality of rules indicative of the level of quality of the connection between the first and second nodes, as well as determining the level of quality of the connection between the first and second nodes based on the plurality of rules. In some embodiments, the visual representation method 160 also includes identifying a communication activity plan to change the level of quality of the connection between the first and second nodes in the social network 130 from the actual level of quality to the target level of quality. Other embodiments of the visual representation method 160 may facilitate additional functionality, as described herein.

Figure 8:
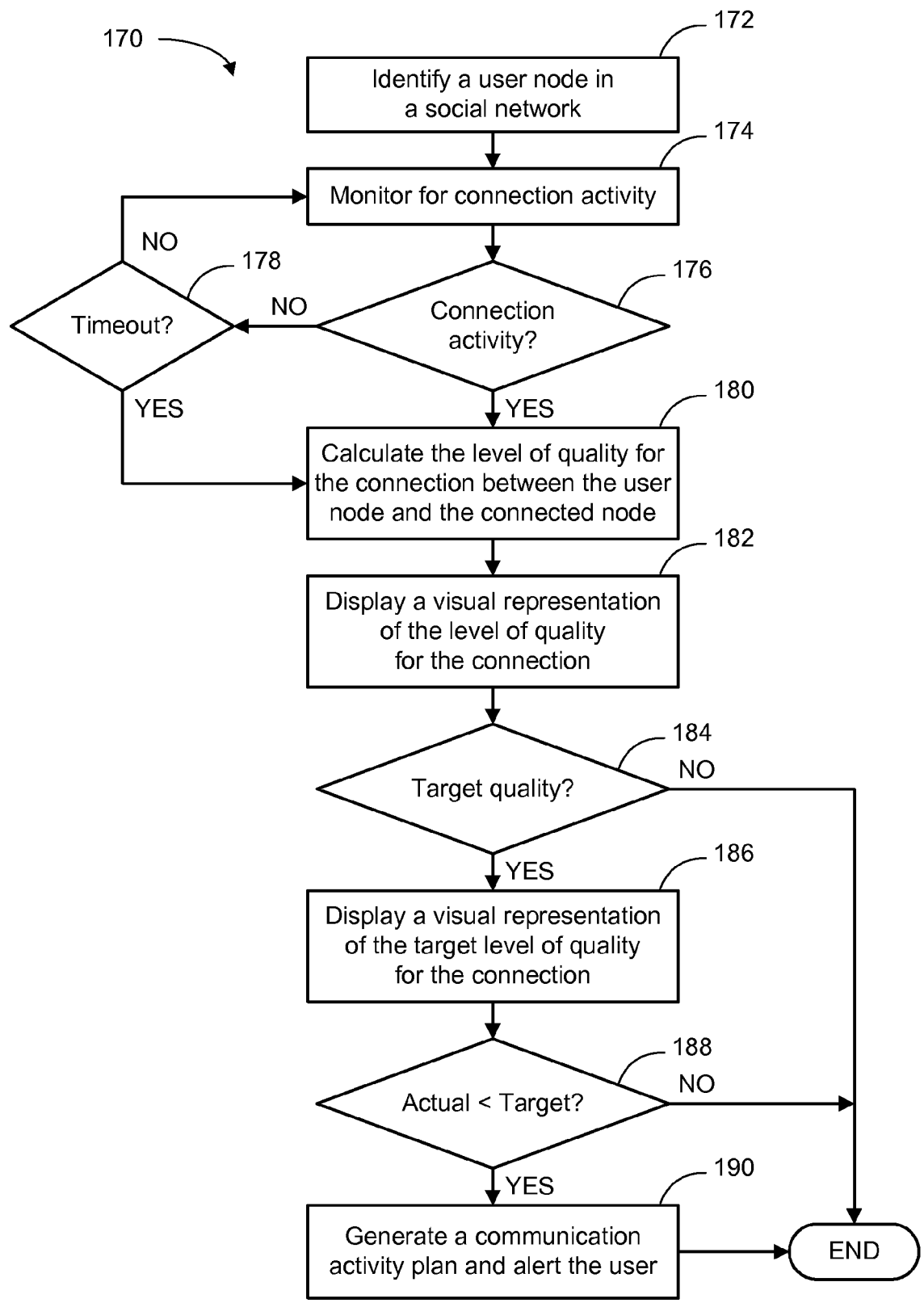
FIG. 8 depicts a schematic flow chart diagram of another embodiment of a visual representation method for representing connection quality within a social network.

FIG. 8 depicts a schematic flow chart diagram of another embodiment of a visual representation method 170 for representing connection quality within a social network. For ease of explanation, the visual representation method 170 is described with reference to the social network 130 of FIG. 5. However some embodiments of the visual representation method 170 may be implemented with other social networks and/or social network maps. Additionally, the visual representation method 170 is described in conjunction with the social network system 140 of FIG. 6, but some embodiments of the visual representation method 170 may be implemented with other social network systems.

In the illustrated visual representation method 170, the quality mapping engine 156 identifies 172 a user node 102 in the social network 130. The quality mapping engine 156 monitors 174 for connection activity involving the identified user node 102. Periodically, at regular or irregular intervals, the quality mapping engine 156 determines 176 if there is connection activity. If there is not connection activity, then the quality mapping engine 156 continues to monitor 174 for connection activity, subject to expiration 178 of a timeout period. If there is connection activity, or if the timeout period expires, then the quality mapping engine 156 calculates 180 the level of quality for the connection between the user node 102 and the connected node 104 with which the activity is detected. In one embodiment, the quality mapping engine 156 accesses one or more rules defined by the rules engine 154 to calculate 180 the level of quality for the connection between the user node 102 and the connected node 104.

The quality mapping engine 156 also displays 182 a visual representation of the level of quality for the connection in a representation of the social network 130. In one embodiment, the calculated level of quality is the actual level of quality for the connection between the user node 102 and the connected node 104. The actual level of quality is represented in the social network 130 by an actual quality indicator 136.

The quality mapping engine 156 also determines 184 if there is a target level of quality assigned to the same connection and, if so, displays 186 a visual representation of the target level of quality for the connection. In one embodiment, the target level of quality is represented in the social network 130 by a target quality indicator 138. After displaying the actual quality indicator 136 and the target quality indicator 138 for the connection, the quality mapping engine 156 determines 188 if the actual level of quality is less than the target level of quality. If the actual level of quality is less than the target level of quality, then the quality mapping engine 156 generates a communication activity plan and alerts the user. The depicted visual representation method 170 then ends. Although the illustrated visual representation method 170 is described for a single connection in the social network 130, similar operations may be implemented serially or in parallel for each of the connections in the social network 130.

It should also be noted that at least some of the operations for the visual representation methods 160 and 170 may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to display a first node in a social network, an operation to display a second node of the social network, and an operation to display a quality indicator representative of a level of quality of a connection between the first and second nodes of the social network.

Further embodiments of the computer program product include an operation to apply a rule to determine the level of quality of the connection between the first and second nodes of the social network. The rule considers, or takes into account, a mode of communication and/or a frequency of communication for each mode of communication. Another embodiment includes an operation to apply a role-specific rule to determine the level of quality of the connection between the first and second nodes of the social network. The role-specific rule corresponds to a type of social relationship between the first and second nodes of the social network.

Another embodiment of the computer program product includes an operation to display a connector line between the first and second nodes of the social network. The connector line has a line characteristic unique to the level of quality of the connection between the first and second nodes of the social network. Another embodiment of the computer program product includes operations to display an actual quality indicator indicative of an actual level of quality of the connection between the first and second of nodes of the social network and to display a target quality indicator indicative of a target level of quality of the connection between the first and second of nodes of the social network. Other embodiments of the computer program product may include operations to implement additional functionality, as described herein.

While conventional social network maps show connections among various social network nodes, the social networks described herein also show quality information for one or more of the connections in the social network. Hence, some embodiments described herein facilitate monitoring dynamic/real-time relationships and allowing a user to apply rules and policies based on defined attributes to govern the social network map. Additionally, the operations related to assigning levels of quality to various connections within a social network map may be applied after a static representation of the social network is already established. In further embodiments, the operations related to assigning levels of quality may be extended to connections beyond the first degree of a social network. Accordingly, the rules engine 154 may be used to define rules that are the same or different for connections that extend beyond the first degree of connections in the social network.

In some embodiments, the levels of quality in a social network may be used in conjunction with service providers such as cell phone service providers and other providers of individual and combined communications services. For example, a user may be able to access a historical view (e.g., a monthly statement) or a real-time view (e.g., an online statement) of the user's social network map as defined by the communications which occur using the service provider's network. In some embodiments, the user's social network includes an analysis of the user's social network, including levels of quality for one or more connections in the user's social network.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer useable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a computer useable storage medium to store a computer readable program that, when executed on a computer, causes the computer to perform operations comprising:
    display a first node and a second node in a social network;
    display an actual quality indicator, wherein the actual quality indicator comprises a connector line between the first and second nodes of the social network, wherein a length of the connector line is representative of an actual level of quality of a connection between the first and second nodes of the social network; and
    display a target quality indicator, wherein the target quality indicator comprises a line, wherein a length of the line is representative of a target level of quality of the connection between the first and second nodes of the social network, wherein the target quality indicator is similar in type to the actual quality indicator, but has at least one distinguishing characteristic, and is displayed to at least partially overlap the actual quality indicator so that the actual quality indicator is at least partially hidden behind the target quality indicator.

2. The computer program product of claim 1, wherein the computer readable program, when executed on the computer, causes the computer to perform an operation to apply a rule to determine the actual level of quality of the connection between the first and second nodes of the social network based on a mode of communication between the first and second nodes of the social network.

3. The computer program product of claim 1, wherein the computer readable program, when executed on the computer, causes the computer to perform an operation to apply a role-specific rule to determine the actual level of quality of the connection between the first and second nodes of the social network, the role-specific rule corresponding to a type of social relationship between the first and second nodes of the social network.

4. The computer program product of claim 1, wherein the computer readable program, when executed on the computer, causes the computer to perform an operation to apply a rule to determine the actual level of quality of the connection between the first and second nodes of the social network based on a frequency of communication between the first and second nodes of the social network.

5. The computer program product of claim 1, wherein the computer readable program, when executed on the computer, causes the computer to perform operations comprising:
    store a plurality of rules indicative of the actual level of quality of the connection between the first and second nodes; and
    determining the actual level of quality of the connection between the first and second nodes based on the plurality of rules.

6. The computer program product of claim 5, wherein the computer readable program, when executed on the computer, causes the computer to perform an operation to suggest a communication activity to adjust the actual level of quality of the connection between the first and second nodes based on the plurality of rules.

7. The computer program product of claim 5, wherein the computer readable program, when executed on the computer, causes the computer to perform an operation to identify a communication activity plan to change the actual level of quality of the connection between the first and second nodes in the social network to the target level of quality.

8. The computer program product of claim 1, wherein the connector line of the actual quality indicator further comprises a line characteristic that further indicates the actual level of quality, the line characteristic comprising a line type, a line weight, a line color, or a combination thereof.

9. The computer program product of claim 1, wherein the line of the target quality indicator further comprises a line characteristic that further indicates the target level of quality, the line characteristic comprising a line type, a line weight, a line color, or a combination thereof.

10. A system comprising:
an electronic memory device to store node information for a plurality of nodes in a social network;
a quality mapping engine coupled to the electronic memory device, the quality mapping engine to assign an actual level of quality to a connection between a pair of nodes of the plurality of nodes in the social network based on at least a mode of communication between the pair of nodes and a type of social relationship between the pair of nodes; and
a graphical display coupled to the quality mapping engine, the graphical display to convey a visual representation of a map of at least a portion of the social network, the map comprising:
the pair of nodes;
an actual quality indicator, wherein the actual quality indicator comprises a connector line between the pair of nodes of the social network, wherein a length of the connector line is representative of the actual level of quality of the connection between the pair of nodes; and
a target quality indicator, wherein the target quality indicator comprises a line, wherein a length of the line is representative of a target level of quality of the connection between the pair of nodes, wherein the target quality indicator is similar in type to the actual quality indicator, but has at least one distinguishing characteristic, and is displayed to at least partially overlap the actual quality indicator so that the actual quality indicator is at least partially hidden behind the target quality indicator.

11. The system of claim 10, wherein the quality mapping engine is further configured to assign the actual level of quality to the connection additionally based on a frequency of communication between the pair of nodes.

12. The system of claim 10, further comprising a rules engine coupled to the quality mapping engine, the rules engine to define a plurality of rules to determine the actual level of quality of the connection between the pair of nodes, wherein the rules comprises a role-specific rule applicable to the type of social relationship between the pair of nodes.

13. The system of claim 12, wherein the quality mapping engine is further configured to suggest a communication activity to adjust the actual level of quality of the connection between the pair of nodes based on the plurality of rules.

14. The system of claim 10, wherein the connector line of the actual quality indicator further comprises a line characteristic that further indicates the actual level of quality, the line characteristic comprising a line type, a line weight, a line color, or a combination thereof.

15. The system of claim 10, wherein the line of the target quality indicator further comprises a line characteristic that further indicates the target level of quality, the line characteristic comprising a line type, a line weight, a line color, or a combination thereof.

16. A method comprising:
generating a first visual indicator representative of a first node in a social network;
generating a second visual indicator representative of a second node in the social network;
displaying an actual quality indicator, wherein the actual quality indicator comprises a connector line between the first and second nodes in the social network, wherein a length of the connector line is representative of an actual level of quality of a connection between the first and second nodes in the social network, wherein the actual level of quality depends on at least a mode of communication between the pair of nodes and a type of social relationship between the pair of nodes; and
displaying a target quality indicator, wherein the target quality indicator comprises a line, wherein a length of the line is representative of a target level of quality of the connection between the first and second of nodes in the social network, wherein the target quality indicator is similar in type to the actual quality indicator, but has at least one distinguishing characteristic, and is displayed to at least partially overlap the actual quality indicator so that the actual quality indicator is at least partially hidden behind the target quality indicator.

17. The method of claim 16, further comprising:
storing a plurality of rules indicative of the actual level of quality of the connection between the first and second nodes; and
determining the actual level of quality of the connection between the first and second nodes based on the plurality of rules.

18. The method of claim 17, further comprising identifying a communication activity plan to change the actual level of quality of the connection between the first and second nodes in the social network according to the plurality of rules.

19. The method of claim 16, wherein the connector line of the actual quality indicator further comprises a line characteristic that further indicates the actual level of quality, the line characteristic comprising a line type, a line weight, a line color, or a combination thereof.

20. The method of claim 16, wherein the line of the target quality indicator further comprises a line characteristic that further indicates the target level of quality, the line characteristic comprising a line type, a line weight, a line color, or a combination thereof.

* * * * *